United States Patent
Okamoto (10) Patent No.: US 10,511,190 B2
(45) Date of Patent: Dec. 17, 2019

(54) POWER TRANSMISSION APPARATUS WIRELESSLY TRANSMITTING POWER TO POWER RECEIVING APPARATUS

(71) Applicant: CANON KABUSHIKI KAISHA, Tokyo (JP)

(72) Inventor: Yoshihiko Okamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 15/353,524

(22) Filed: Nov. 16, 2016

(65) Prior Publication Data
US 2017/0155280 A1 Jun. 1, 2017

(30) Foreign Application Priority Data
Nov. 27, 2015 (JP) .................... 2015-232310

(51) Int. Cl.
| | | |
|---|---|---|
| *H02J 50/60* | (2016.01) | |
| *H02J 50/10* | (2016.01) | |
| *H02J 7/02* | (2016.01) | |
| *H02J 7/00* | (2006.01) | |

(52) U.S. Cl.
CPC ............ *H02J 50/10* (2016.02); *H02J 7/0042* (2013.01); *H02J 7/025* (2013.01); *H02J 50/60* (2016.02)

(58) Field of Classification Search
CPC .......... H02J 50/10; H02J 7/025; H02J 7/0042; H02J 50/60
See application file for complete search history.

(56) References Cited

U.S. PATENT DOCUMENTS

| | | | | |
|---|---|---|---|---|
| 6,176,433 B1* | 1/2001 | Uesaka | ............ | G06K 7/10346 235/380 |
| 6,362,625 B1* | 3/2002 | Wiegert | ................. | G01N 27/82 324/235 |
| 9,893,557 B2* | 2/2018 | Filippenko | ............. | H02J 17/00 |
| 9,985,475 B2* | 5/2018 | Tsukamoto | ............. | H02J 17/00 |
| 2007/0008235 A1* | 1/2007 | Tsukahara | ............ | B60R 25/246 343/788 |
| 2007/0223649 A1* | 9/2007 | De Godzinsky | ....... | A61B 6/145 378/4 |

(Continued)

FOREIGN PATENT DOCUMENTS

| | | |
|---|---|---|
| JP | 2008-295274 A | 12/2008 |
| JP | 2012-016125 A | 1/2012 |

(Continued)

*Primary Examiner* — Pinping Sun
(74) *Attorney, Agent, or Firm* — Canon U.S.A., Inc. IP Division (57) ABSTRACT

A power transmission apparatus includes a power transmission unit that wirelessly transmits power to an electronic device, a foreign substance detection unit that detects a foreign substance affecting power transmission performed by the power transmission unit, a loop shaped power transmission antenna serving as an antenna for the power transmission unit transmitting power to the electronic device, and a foreign substance detection antenna for the foreign substance detection unit detecting the foreign substance, wherein the foreign substance detection antenna is arranged at a predetermined distance or more from the power transmission antenna in a vertical direction to a loop direction of the power transmission antenna.

10 Claims, 8 Drawing Sheets

(56) References Cited

U.S. PATENT DOCUMENTS

| | | | | |
|---|---|---|---|---|
| 2007/0286335 A1* | 12/2007 | De Godzinsky | ....... | A61B 6/145 |
| | | | | 378/28 |
| 2008/0297107 A1* | 12/2008 | Kato | ................ | H01F 27/2871 |
| | | | | 320/108 |
| 2013/0099592 A1* | 4/2013 | Abe | ...................... | H02J 5/005 |
| | | | | 307/104 |
| 2013/0169062 A1* | 7/2013 | Maikawa | ................ | H02J 50/10 |
| | | | | 307/104 |
| 2013/0169466 A1* | 7/2013 | Frederick | ............. | G08B 13/248 |
| | | | | 342/22 |
| 2014/0084857 A1* | 3/2014 | Liu | ...................... | H02J 5/005 |
| | | | | 320/108 |
| 2014/0103732 A1* | 4/2014 | Irie | ...................... | H02J 5/005 |
| | | | | 307/104 |
| 2014/0183970 A1* | 7/2014 | Kurihara | ................ | H02J 50/80 |
| | | | | 307/104 |
| 2015/0015086 A1* | 1/2015 | Krammer | ............. | B60L 11/182 |
| | | | | 307/104 |
| 2015/0145530 A1* | 5/2015 | Urano | .................. | H01F 27/402 |
| | | | | 324/655 |
| 2015/0323694 A1* | 11/2015 | Roy | ...................... | H02J 17/00 |
| | | | | 307/104 |
| 2016/0202100 A1* | 7/2016 | Hogendoorn | ........ | G01N 24/081 |
| 2016/0270686 A1* | 9/2016 | Diamond | ................ | A61B 5/05 |
| 2017/0033609 A1* | 2/2017 | Nakamura | ............. | H02J 5/005 |
| 2017/0299755 A1* | 10/2017 | Cole | .................... | G01V 3/165 |

FOREIGN PATENT DOCUMENTS

| | | | |
|---|---|---|---|
| JP | 2012-249401 A | 12/2012 | |
| JP | 2013-027074 A | 2/2013 | |
| JP | WO 2013018268 A1 * | 2/2013 | ............ H01F 38/14 |
| JP | 2014-126512 A | 7/2014 | |

* cited by examiner

POWER TRANSMISSION APPARATUS WIRELESSLY TRANSMITTING POWER TO POWER RECEIVING APPARATUS

BACKGROUND

Field

The present disclosure generally relates to a power transmission apparatus that wirelessly transmits power to a power receiving apparatus.

Description of the Related Art

In recent years, there has been known a wireless power transmission system including a power transmission apparatus including a primary coil for wirelessly supplying power without being physically connected via a connector, and a power receiving device including a secondary coil for wirelessly receiving the power supplied from the power transmission apparatus. In the wireless power transmission system, if a foreign substance, such as a metal object and an IC card, is arranged between the primary coil and the secondary coil, or near these coils, the power supplied from the primary coil can be supplied to the foreign substance and the foreign substance can be damaged.

Japanese Patent Laid-Open No. 2014-126512 discloses a technique of using a detection coil including a figure of eight formed in such a manner that induction currents flow in opposite directions when a magnetic flux circulating between a primary coil and a secondary coil passes through the detection coil. In this technique, a metal object is assumed to be detected based on a change in impedance of the detection coil.

In the technique described in Japanese Patent Laid-Open No. 2014-126512, the uniformity of magnetic field intensities within the detection coil is not mentioned. In the detection coil including a figure of eight, in which induction currents flow in the opposite directions when the magnetic flux circulating between the primary coil and the secondary coil passes through the detection coil, the magnetic field intensities within the detection coil do not become substantially uniform. Thus, the impedance varies depending on a position where a power receiving device including a metal object is arranged in a housing structure, and it cannot be determined whether a foreign substance has been detected or the position of the power receiving device has merely shifted.

SUMMARY

A power transmission apparatus includes a power transmission unit configured to wirelessly transmit power to an electronic device, a foreign substance detection unit configured to detect a foreign substance affecting power transmission performed by the power transmission unit, a loop shaped power transmission antenna serving as an antenna for the power transmission unit transmitting power to the electronic device, and a foreign substance detection antenna for the foreign substance detection unit detecting the foreign substance, wherein the foreign substance detection antenna is arranged at a predetermined distance or more from the power transmission antenna in a vertical direction to a loop direction of the power transmission antenna.

Further features will become apparent from the following description of exemplary embodiments with reference to the attached drawings.

DESCRIPTION OF THE EMBODIMENTS

An exemplary embodiment will be described in detail below based on the attached drawings. The exemplary embodiment is not limited to the following exemplary embodiment, and various modifications and changes can be made within the gist thereof.

[First Exemplary Embodiment]

Figure 1:
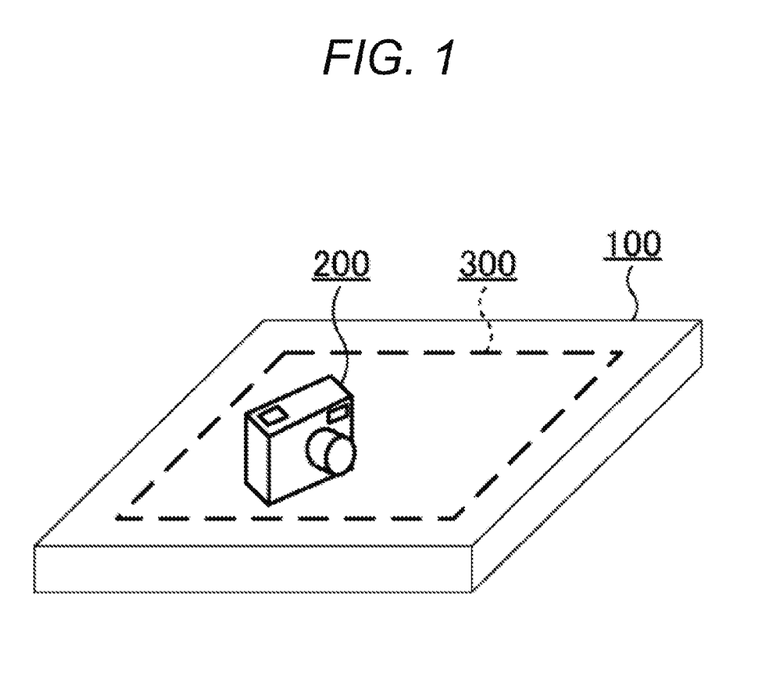
FIG. 1 is a diagram illustrating a configuration example of a wireless power transmission system according to a first exemplary embodiment.

FIG. 1 is a diagram illustrating a configuration example of a wireless power transmission system according to a first exemplary embodiment.

As illustrated in FIG. 1, the wireless power transmission system according to the first exemplary embodiment includes a power transmission apparatus 100 and an electronic device 200 that performs communication with the power transmission apparatus 100 to receive power supply. In another exemplary embodiment, the power transmission apparatus 100 can wirelessly supply power concurrently to a plurality of electronic devices.

If the electronic device 200 exists within a predetermined range 300 in the power transmission apparatus 100, the power transmission apparatus 100 performs wireless communication via a communication antenna, and determines whether the electronic device 200 is a device that can receive power. The predetermined range 300 refers to a range in which the electronic device 200 can communicate with the power transmission apparatus 100.

If the power transmission apparatus 100 determines that the electronic device 200 is a device that can receive power, the power transmission apparatus 100 supplies power for power transmission to the electronic device 200 via a power transmission antenna. The electronic device 200 including a power receiving antenna wirelessly receives the power supplied from the power transmission apparatus 100 via the power receiving antenna.

If the electronic device 200 does not exist within the predetermined range 300 in the power transmission apparatus 100, the electronic device 200 cannot receive power from the power transmission apparatus 100.

The electronic device 200 is an electronic device operated by power supplied from a secondary battery, and is, for example, a tablet personal computer (PC), a smartphone, a digital still camera, a digital video camera. In addition, the electronic device 200 can be a moving device such as a vehicle that is driven by power supplied from the secondary battery.

If the secondary battery is not attached to the electronic device 200, the electronic device 200 can be an electronic device operable by power supplied from the power transmission apparatus 100.

(Internal Configuration of Power Transmission Apparatus 100)

Figure 2A:
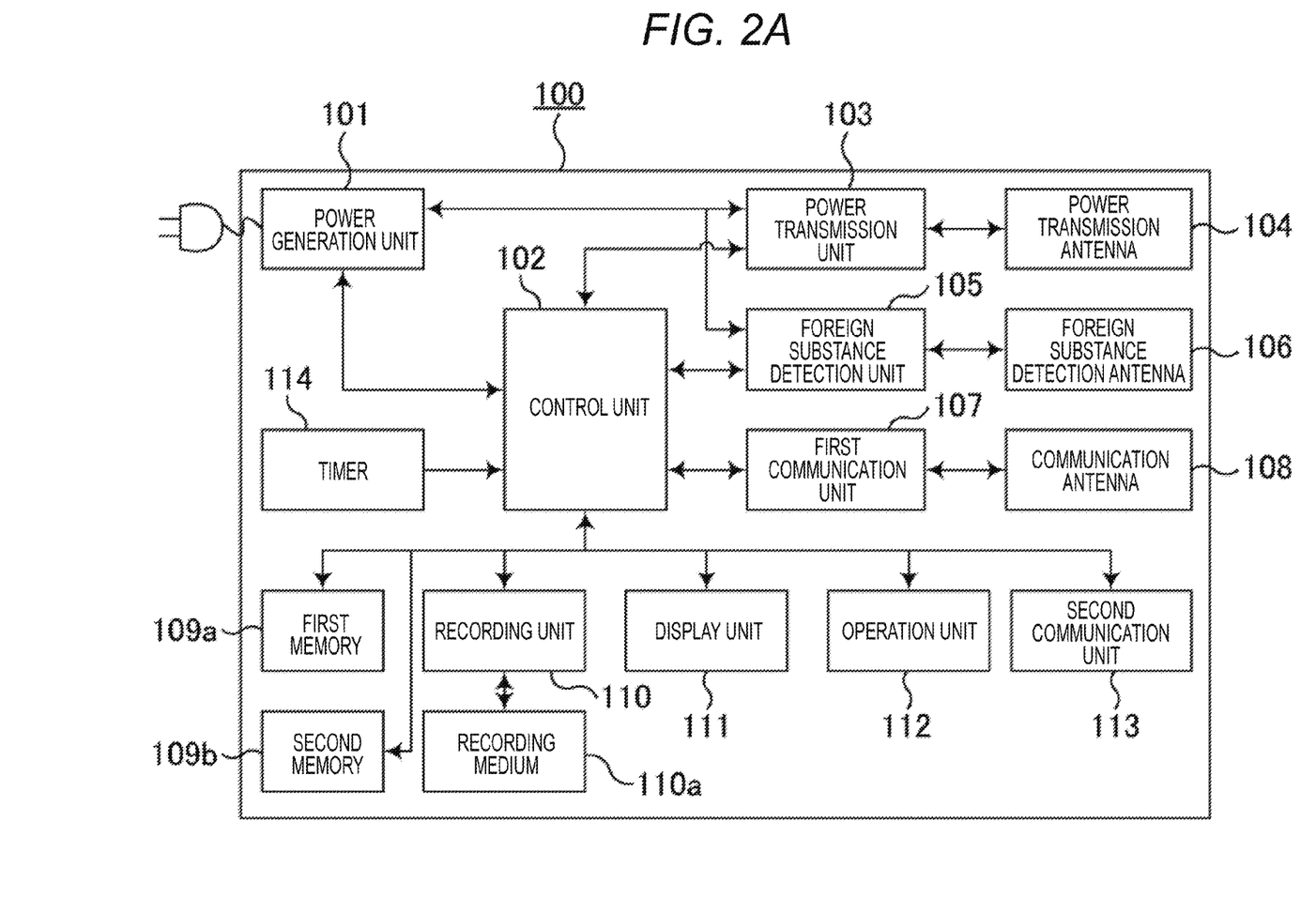
FIGS. 2A to 2C are block diagrams illustrating an internal configuration example of a power transmission apparatus 100 according to the first exemplary embodiment.

FIG. 2A is a block diagram illustrating an internal configuration example of the power transmission apparatus 100 according to the first exemplary embodiment.

As illustrated in FIG. 2A, the power transmission apparatus 100 includes a power generation unit 101, a control unit 102, a power transmission unit 103, a power transmission antenna 104, a foreign substance detection unit 105, a foreign substance detection antenna 106, a first communication unit 107, and a communication antenna 108. The power transmission apparatus 100 also includes a first memory 109a, a second memory 109b, a recording unit 110, a display unit 111, an operation unit 112, a second communication unit 113, and a timer 114. A recording medium 110a can be attached to the power transmission apparatus 100.

Figure 2B:
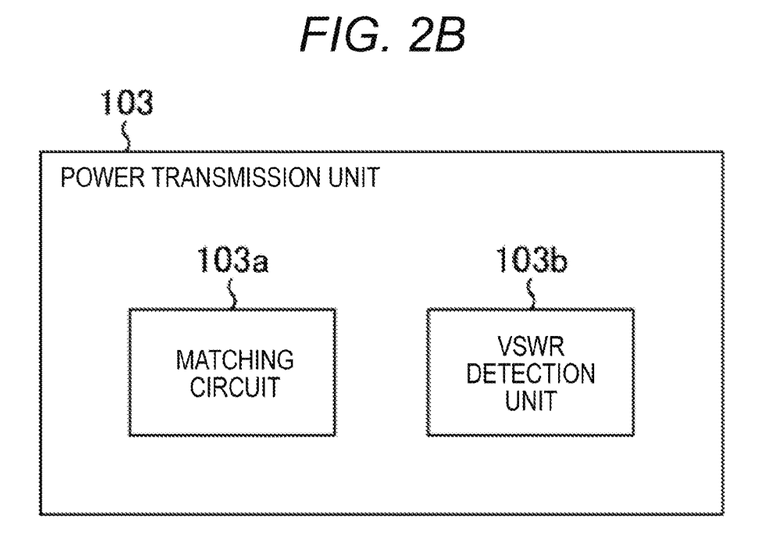
Figure 2C:
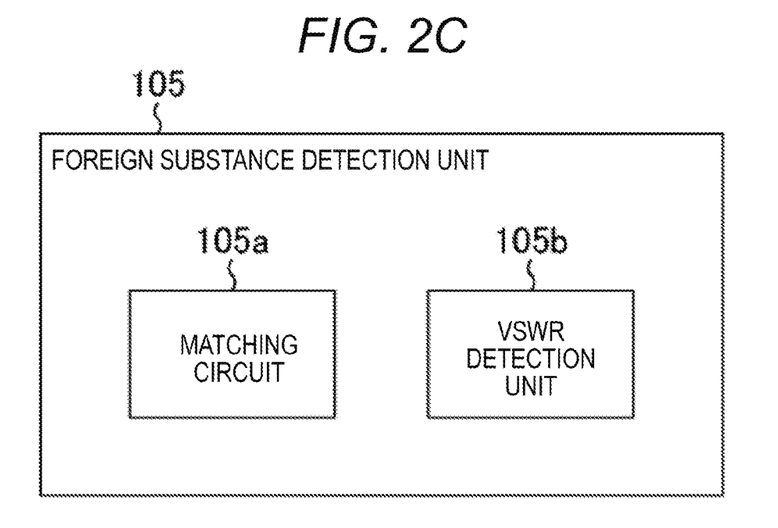

As illustrated in FIG. 2B, the power transmission unit 103 includes a matching circuit 103a and a voltage standing wave ratio (VSWR) detection unit 103b. As illustrated in FIG. 2C, the foreign substance detection unit 105 includes a matching circuit 105a and a VSWR detection unit 105b.

The power generation unit 101 converts alternating-current power supplied from an AC power source into direct-current power, and supplies the converted direct-current power to each element of the power transmission apparatus 100. In addition, the power generation unit 101 generates power to be supplied to the electronic device 200 via the power transmission antenna 104. Power is supplied to the electronic device 200 according to a predetermined power transmission method, such as, for example, a power transmission method that uses a magnetic resonance method or an electromagnetic induction method.

The power generated by the power generation unit 101 includes first power and second power. The first power is power supplied to the foreign substance detection antenna 106 via the foreign substance detection unit 105 as part of the power transmission apparatus 100 detecting whether a foreign substance exists. The second power is power supplied to the power transmission antenna 104 via the power transmission unit 103 if the power transmission apparatus 100 transmits power to the electronic device 200. The first power amount is assumed to be less than the second power amount.

The control unit 102 is, for example, a central processing unit (CPU), and controls each element of the power transmission apparatus 100 using power supplied from the power generation unit 101. The control unit 102 controls an operation of each element of the power transmission apparatus 100 by executing a computer program recorded in the first memory 109a.

The control unit 102 inputs information of a voltage standing wave ratio (VSWR) from the power transmission unit 103. Then, using the input VSWR, the control unit 102 detects whether the impedance of the power transmission apparatus 100 and the impedance of the electronic device 200 match each other.

The control unit 102 can detect the existence of a foreign substance based on the VSWR information supplied from the power transmission unit 103 or the foreign substance detection unit 105. Foreign substance refers to, for example, an object, such as an electronic device equipped with an IC tag like a Radio Frequency Identification (RFID), an IC card, a metal object, and the like, and refers to an object that affects a magnetic field.

The control unit 102 adjusts the matching circuit 103a in the power transmission unit 103 and the matching circuit 105a in the foreign substance detection unit 105. The matching circuits 103a and 105a each include a matching adjustment element, such as variable capacitors, capacitors, variable coils, coils, variable resistors, resistors, etc. The matching circuits 103a and 105a can each include a switch.

The matching circuit 103a in the power transmission unit 103 is a resonance circuit for performing resonance with a power receiving antenna included in a power transmission target electronic device selected by the power transmission antenna 104 and the control unit 102. The matching circuit 103a includes a circuit for performing impedance matching between the power generation unit 101 and the power transmission antenna 104.

The matching circuit 105a in the foreign substance detection unit 105 is a resonance circuit for adjusting a resonance frequency, and includes a circuit for performing impedance matching between the power generation unit 101 and the foreign substance detection antenna 106. The resonance frequency is a frequency for the power transmission apparatus 100 and a power transmission target electronic device of the power transmission apparatus 100 performing resonance, and hereinafter is referred to as "a resonance frequency f". The following formula (1) represents the resonance frequency f. In the formula, L denotes a value of inductance caused by the power transmission antenna 104 and an external parasitic factor, and C denotes a value of capacitance caused by the matching circuit 103a and a parasitic factor.

$$F=1/\{2\pi(LC)^{1/2}\} \quad \text{Formula (1)}$$

By controlling the values of the variable capacitor and the variable coil of the matching circuit 103a in the power transmission unit 103, the control unit 102 sets power to be supplied from the power transmission antenna 104, so as to obtain the resonance frequency f. The resonance frequency f is set at 13.56 MHz, for example. The resonance frequency f can be set at 6.78 MHz or at a frequency defined by a communication standard of the first communication unit 107.

By controlling the values of the variable capacitor and the variable coil of the matching circuit 105a in the foreign substance detection unit 105, the control unit 102 sets the resonance frequency f of power to be supplied from the foreign substance detection antenna 106. The resonance frequency f is set at 13.56 MHz, for example. The resonance frequency f can be set at 6.78 MHz or at a frequency defined by a communication standard of the first communication unit 107.

The VSWR detection unit 103b in the power transmission unit 103 detects a VSWR for detecting an impedance matching state of the power transmission apparatus 100 and the electronic device 200. The VSWR detection unit 103b then supplies information of the detected VSWR to the control unit 102. The VSWR is a value indicating a relationship between a traveling wave of power supplied from the power transmission antenna 104 and a reflected wave of power supplied from the power transmission antenna 104, and is represented by the following formula (2):

$$VSWR=(1+\rho)/(1-\rho) \quad \text{Formula (2)},$$

In the formula, $\rho=(Z-Zo)/(Z+Zo)=Vr/Vf$.

In the formula, Z denotes an added impedance and Zo denotes a characteristic impedance of a transmission line. Vf denotes an amplitude voltage of the traveling wave and Vr denotes an amplitude voltage of the reflected wave. In a state in which impedances match each other, the amplitude voltage Vr of the reflected wave becomes zero and Z=Zo is obtained, so that the VSWR becomes 1. The value of VSWR that is closer to 1 indicates a more efficient state in which reflected power is smaller, and the loss of power supplied from the power transmission apparatus 100 to the electronic device 200 is smaller.

The power transmission antenna 104 is an antenna for supplying power, generated by the power generation unit 101, external to the power transmission apparatus 100. The power transmission apparatus 100 supplies power to the electronic device 200 via the power transmission antenna 104. The arrangement of the power transmission antenna 104 in the power transmission apparatus 100 is described below.

The matching circuit 105a in the foreign substance detection unit 105 is a component similar to the matching circuit 103a in the power transmission unit 103. The VSWR detection unit 105b in the foreign substance detection unit 105 is a component similar to the VSWR detection unit 103b in the power transmission unit 103.

The foreign substance detection antenna 106 is an antenna for supplying power generated by the power generation unit 101 external to the power transmission apparatus 100. The power transmission apparatus 100 determines the existence or non-existence of a foreign substance using a VSWR detected by the foreign substance detection unit 105 via the foreign substance detection antenna 106. The arrangement of the foreign substance detection antenna 106 in the power transmission apparatus 100 is described below.

The first communication unit 107 performs wireless communication, for example, based on a Near Field Communication (NFC) standard defined by the NFC forum. In addition, the first communication unit 107 can perform wireless communication based on the ISO/IEC 18092 standard, the ISO/IEC14443 standard, or the ISO/IEC 21481 standard. Information transmitted and received between the first communication unit 107 and the electronic device 200 is information compatible with an NFC Data Exchange Format (NDEF).

When the first communication unit 107 transmits information compatible with the NDEF to the electronic device 200, the first communication unit 107 converts power supplied from the power generation unit 101 into a pulse signal by performing amplitude shift keying (ASK) that uses an amplitude shift. ASK refers to keying that uses an amplitude shift, and is used for communication with a card reader that wirelessly communicates with an IC card, etc.

By switching an analog multiplier and a load resistor (not illustrated) that are included in the first communication unit 107, the first communication unit 107 changes the amplitude of power generated by the power generation unit 101 to change the power into a pulse signal. The pulse signal changed by the first communication unit 107 is supplied to the communication antenna 108, and is transmitted to the electronic device 200 as a command. The first communication unit 107 includes an encoding circuit that uses a predetermined encoding method.

When the first communication unit 107 receives information compatible with the NDEF from the electronic device 200, the first communication unit 107 can demodulate, using the encoding circuit, a response from the electronic device 200 to the command transmitted to the electronic device 200, according to a change in current flowing in the communication antenna 108. With this configuration, the first communication unit 107 can receive, from the electronic device 200, a response to a request transmitted to the electronic device 200 using a load modulation method, and information transmitted from the electronic device 200. The first communication unit 107 transmits a command to the electronic device 200 according to an instruction from the control unit 102. If the first communication unit 107 receives a response or information from the electronic device 200, the first communication unit 107 demodulates the received response, and supplies the demodulated response to the control unit 102.

The first communication unit 107 includes a register that can change a communication setting. By changing this register, the control unit 102 can adjust communication sensitivity. The first communication unit 107 can separately include registers for respective communication methods. For example, the first communication unit 107 can be configured to include registers that can adjust the respective communication sensitivities of the Type A, the Type B, and the Type F of the NFC communication standard.

The communication antenna 108 is an antenna for performing communication with the electronic device 200 according to a communication method employed by the first communication unit 107. The power transmission apparatus 100 transmits information to the electronic device 200 via the communication antenna 108. The power transmission apparatus 100 receives, via the communication antenna 108, a response corresponding to information transmitted to the electronic device 200, and information transmitted from the electronic device 200. For example, communication is performed according to the electromagnetic induction method, in which a magnetic field is generated by current flowing in a loop pattern of the communication antenna 108 and induction current flows, via the generated magnetic field, in a communication antenna equipped in a facing electronic device 200. The arrangement of the communication antenna 108 in the power transmission apparatus 100 is described below.

The first memory 109a records a computer program for controlling an operation of each element of the power transmission apparatus 100 and information, such as a parameter related to an operation of each element. The first memory 109a also records information necessary for the control unit 102 adjusting the matching circuit 103a in the power transmission unit 103 and the matching circuit 105a in the foreign substance detection unit 105, as well as range information of the VSWR.

The first memory 109a can store a plurality of pieces of information necessary for the control unit 102 adjusting the matching circuit 103a in the power transmission unit 103 and the matching circuit 105a in the foreign substance detection unit 105. Examples of the information necessary for the adjustment include information when the power source of the power transmission apparatus 100 is started up. Other examples include information for the control unit 102 adjusting the matching circuit 103a in the power transmission unit 103 when the power transmission apparatus 100 transmits power to the electronic device 200, information for adjusting the matching circuit 105a in the foreign substance detection unit 105 as part of the power transmission apparatus 100 detecting whether a foreign substance exists, etc. The first memory 109a can record information for adjusting the matching circuit 103a in the power transmission unit 103 and the matching circuit 105a in the foreign substance detection unit 105 created by the control unit 102 via the operation unit 112 according to a user operation. The first memory 109a can record information for adjusting the matching circuit 103a in the power transmission unit 103 and the matching circuit 105a in the foreign substance detection unit 105 that are in a factory default state.

The first memory 109a can record a plurality of pieces of range information of the VSWR. If the electronic device 200 exists within the predetermined range 300 in the power transmission apparatus 100, the range information of the VSWR refers to, for example, information indicating "VSWR value: greater than or equal to 1.5 and less than 2.0" as a condition under which the power transmission apparatus 100 does not detect a foreign substance other than the electronic device 200. The range information of the VSWR also includes, for example, information indicating "VSWR value: greater than or equal to 1.0 and less than 1.5" as a condition under which a foreign substance is not detected while the power transmission apparatus 100 is transmitting power to the electronic device 200.

The first memory 109a also records image information to be displayed on the display unit 111. The first memory 109a records identification information of the power transmission apparatus 100, a power transmission parameter, a flag for controlling power transmission, information received from the electronic device 200 via the first communication unit 107 or the second communication unit 113, etc.

The second memory 109b is a rewritable memory. The second memory 109b can operate as a working memory of the control unit 102. Thus, the second memory 109b can store various types of information, data, values, parameters, and programs used in the control unit 102.

The recording unit 110 records information received via the first communication unit 107 or the second communication unit 113 into the recording medium 110a. In addition, the recording unit 110 can read out information, such as image information and audio information, from the recording medium 110a. The control unit 102 can also display the read-out image information on the display unit 111, or supply the read-out information, such as image information and audio information, to the first communication unit 107 or the second communication unit 113. The recording medium 110a can be a hard disc, a memory card, etc. It can either be included in the power transmission apparatus 100, or can be an external detachable recording medium.

The display unit 111 displays image information read-out by the recording unit 110 from the recording medium 110a, image information supplied from the first memory 109a, or image information supplied from the second communication unit 113. The image information refers to a message, such as a message for notifying a user of a communication status of the electronic device 200, etc.

The display unit 111 can also include a High-Definition Multimedia Interface (HDMI®) connector for connecting to a monitor of an external device.

The operation unit 112 provides a user interface for operating the power transmission apparatus 100. The operation unit 112 includes a power button for operating the power transmission apparatus 100, a mode switching button for switching an operation mode of the power transmission apparatus 100, a setting change button for changing the setting of the power transmission apparatus 100, and the like, and each button includes a switch, a touch panel, etc. The control unit 102 controls the power transmission apparatus 100 according to a user instruction input via the operation unit 112. The operation unit 112 can also include a configuration for receiving a remote control signal from a remote controller, and the control unit 102 can be configured to control the power transmission apparatus 100 according to the received remote control signal.

The second communication unit 113 performs wireless communication with the electronic device 200 based on a communication standard different from the communication standard of the first communication unit 107. Examples of the communication standard of the second communication unit 113 include the Bluetooth® standard, a wireless LAN standard (IEEE802.11a, b, g, n, ac, etc.), etc. The second communication unit 113 transmits information, such as image information and audio information, supplied from the first memory 109a or the recording medium 110a to the electronic device 200. The second communication unit 113 receives information, such as image information and audio information, transmitted from the electronic device 200 to the power transmission apparatus 100.

The second communication unit 113 can also receive device information of the electronic device 200. Examples of the device information of the electronic device 200 include a charge state of the secondary battery included in the electronic device 200, information indicating a state of being connected to a commercial power supply via an AC adapter, a state of being connected to another communication apparatus, an operation state of each function included in the electronic device 200, etc. The control unit 102 records the device information of the electronic device 200 received via the second communication unit 113 in the first memory 109a.

The timer 114 measures a current time and a time related to an operation or processing performed by each element of the power transmission apparatus 100. Information of a threshold value set for the time measured by the timer 114 is prerecorded in the first memory 109a.

The power transmission apparatus 100 can also include a loudspeaker unit (not illustrated). The loudspeaker unit outputs audio information read-out by the recording unit 110 from the recording medium 110a, audio information supplied from the first memory 109a, or audio information supplied from the second communication unit 113.

Next, the arrangement of the power transmission antenna 104, the foreign substance detection antenna 106, and the communication antenna 108 will be described.

Figure 3A:
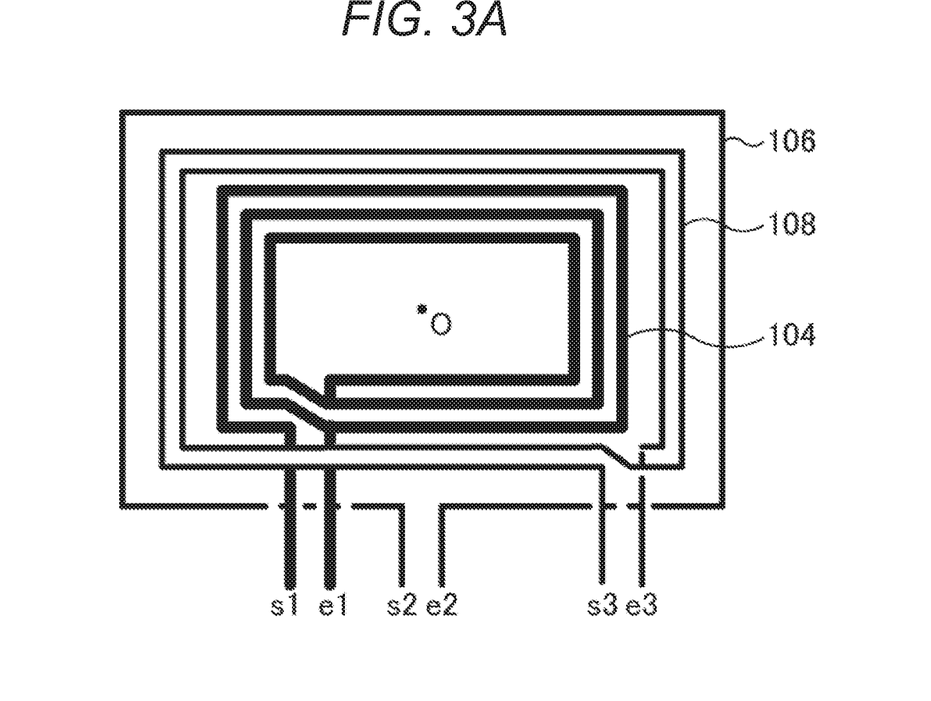
FIGS. 3A and 3B are diagrams illustrating an example of arrangement of a power transmission antenna 104, a foreign substance detection antenna 106, and a communication antenna 108 according to the first exemplary embodiment.
Figure 3B:
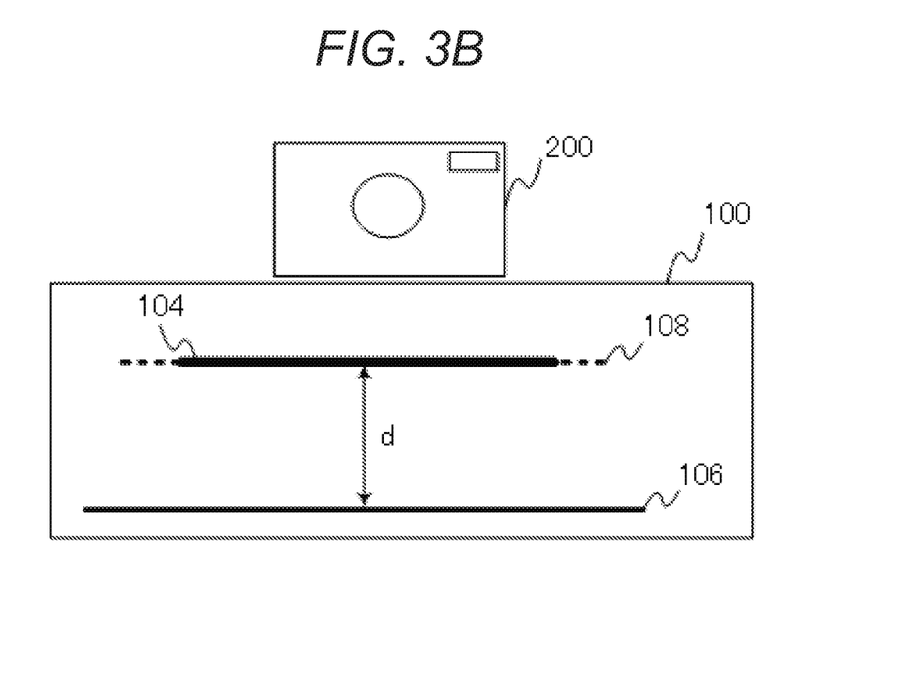

FIGS. 3A and 3B are diagrams illustrating an example of arrangement of the power transmission antenna 104, the foreign substance detection antenna 106, and the communication antenna 108 according to the first exemplary embodiment.

FIG. 3A illustrates an example of a case in which the power transmission antenna 104, the foreign substance detection antenna 106, and the communication antenna 108 are viewed in a vertical direction from a loop pattern surface. FIG. 3B illustrates an example of a case in which the antennas are viewed in a horizontal direction from the loop pattern surface.

In the example illustrated in FIG. 3A, a loop pattern of the foreign substance detection antenna 106 is arranged on the outermost side, and the communication antenna 108 and the power transmission antenna 104 are arranged in this order toward the inner side. The antennas can be arranged in any order as long as the power transmission antenna 104 is arranged on the inner side of the loop pattern of the foreign substance detection antenna 106. For example, the communication antenna 108, the foreign substance detection antenna 106, and the power transmission antenna 104 can be arranged in this order from the outer side. If a power transmissible range exceeds a foreign substance detectable range, a foreign substance existing at a power transmissible position cannot be detected. To prevent this, the loop pattern of the foreign substance detection antenna 106 is arranged on the outer side of the power transmission antenna 104 so that the foreign substance detectable range encompasses the power transmissible range.

The foreign substance detection antenna 106 includes a single wind of loop pattern so that the magnetic field intensities become substantially uniform in a range in which the power transmission antenna 104 is arranged. If the foreign substance detection antenna 106 includes a plurality of winds of loop patterns, magnetic fields function to cancel out each other between a certain loop and a neighboring loop, thus making it difficult to keep the uniformity of the magnetic field intensities. Thus, in the example illustrated in FIG. 3A, the foreign substance detection antenna 106 employs a single wind of loop pattern. If the number of winds of the loops of the foreign substance detection antenna 106 increases, an area of the foreign substance detection antenna 106 increases. Thus, the number of winds is reduced to a single wind.

The foreign substance detection antenna 106 can have a plurality of winds of loop patterns as long as the innermost loop of the foreign substance detection antenna 106 is on the outer side of the power transmission antenna 104. As the area of the foreign substance detection antenna 106 increases, the central magnetic field intensity tends to be weaker as compared with surrounding magnetic field intensities. If the foreign substance detection antenna 106 includes a plurality of winds of loops, in some cases, the magnetic field intensities can be easily made substantially uniform in the area in which the power transmission antenna 104 is arranged, depending on the external form size of the foreign substance detection antenna 106.

With respect to the heights of the antennas, as illustrated in FIG. 3B, the power transmission antenna 104 and the communication antenna 108 are arranged at the same height, and the foreign substance detection antenna 106 is arranged below at a predetermined distance d from the power transmission antenna 104 and the communication antenna 108. The upper side in FIG. 3B corresponds to the housing of the power transmission apparatus 100. If power transmission efficiency is considered, it is preferable to arrange the power transmission antenna 104 at a position closer to the housing. The electronic device 200 to receive power is brought closer to the side of the power transmission antenna 104 that is an opposite side of the foreign substance detection antenna 106. The reason for arranging the foreign substance detection antenna 106 below the power transmission antenna 104 will be described below. The communication antenna 108 does not have to be at the same height as the power transmission antenna 104.

Figure 3C:
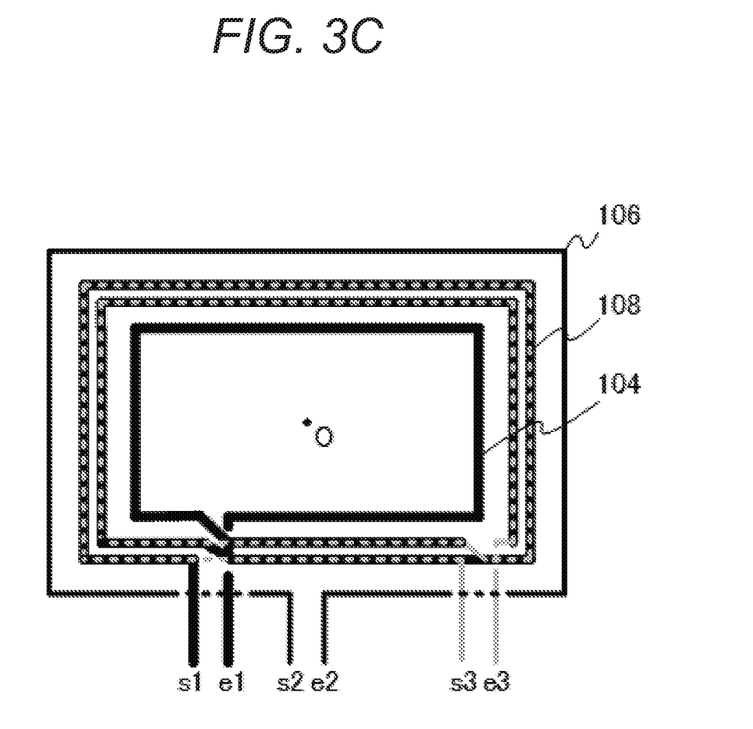

Unlike the example illustrated in FIG. 3A, the external form sizes of the power transmission antenna 104 and the foreign substance detection antenna 106 can be the same (as illustrated in FIG. 3C). In this case, the foreign substance detection antenna 106 is assumed to be arranged below at the predetermined distance d from the power transmission antenna 104. If the foreign substance detection antenna 106 is arranged close to the power transmission antenna 104, the magnetic field intensities are difficult to be substantially uniform in a range in the loop of the foreign substance detection antenna 106 where the power transmission antenna 104 is arranged. Thus, the foreign substance detection antenna 106 is separated from the power transmission antenna by the predetermined distance or more, for making the magnetic field intensities uniform as far as possible in the area in which the power transmission antenna 104 is arranged.

In FIG. 3A, s1 indicates a winding start of the power transmission antenna 104, and e1 indicates a winding end of the power transmission antenna 104. Similarly, s2 indicates a winding start of the foreign substance detection antenna 106, and e2 indicates a winding end of the foreign substance detection antenna 106. In addition, s3 indicates a winding start of the communication antenna 108, and e3 indicates a winding end of the communication antenna 108. As illustrated in FIG. 3A, the loop of each antenna is configured to include no branch in an area from the winding start s to the winding end e.

If the central part of the power transmission antenna 104, the foreign substance detection antenna 106, and the communication antenna 108 is denoted by "O", each antenna is assumed to be wound in a loop direction around the central "O" serving as a central axis. Each antenna is wound around the central "O" serving as the central axis for the following reason. When the power transmission antenna 104 is arranged on the inner side of the foreign substance detection antenna 106, if the power transmission antenna 104 is arranged at a decentered position, it becomes difficult to make the magnetic field intensities substantially uniform in a region in which the power transmission antenna 104 is arranged. By matching the central axes of the foreign substance detection antenna 106 and the power transmission antenna 104, a range in the foreign substance detection antenna 106 where magnetic field intensities are substantially uniform can be efficiently used, and the area of the foreign substance detection antenna 106 can be reduced. The shape of the loop is not limited to a rectangle, a circle, and a square, and can be a precise circle.

It is preferable that the respective loops of the foreign substance detection antenna 106 and the communication antenna 108 are formed to have widths from approximately 0.5 mm to 1.5 mm. It is preferable that the loop of the power transmission antenna 104 is formed to have a width from approximately 1.0 mm to 4.0 mm because power to be transmitted is large. It is preferable that the material of the power transmission antenna 104, the foreign substance detection antenna 106, and the communication antenna 108 is a loop-shaped thin film pattern made of copper and plating, and is the one having a thickness of approximately several tens μm.

In addition, each antenna can be formed on an FR-4 substrate, or can be formed on a flexible substrate. The power transmission antenna 104 and the communication antenna 108 can be formed on the same substrate. The foreign substance detection antenna 106 is arranged via a spacer or the like that has a thickness of the predetermined distance d from the substrate on which the power transmission antenna 104 and the communication antenna 108 are formed.

(Description of Magnetic Field Distribution of Foreign Substance Detection Antenna 106)

Figure 4A:
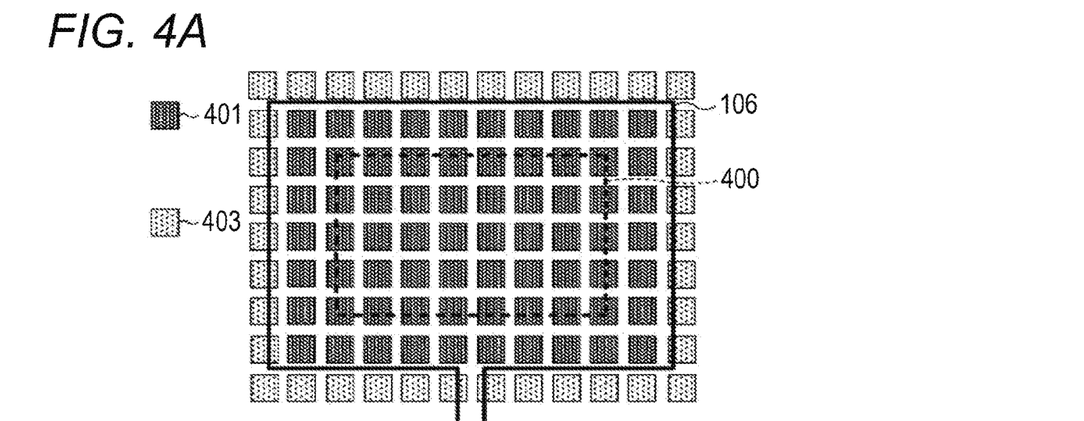
FIGS. 4A to 4C are diagrams each illustrating an example of a magnetic field distribution of the foreign substance detection antenna 106 according to the first exemplary embodiment.
Figure 4B:
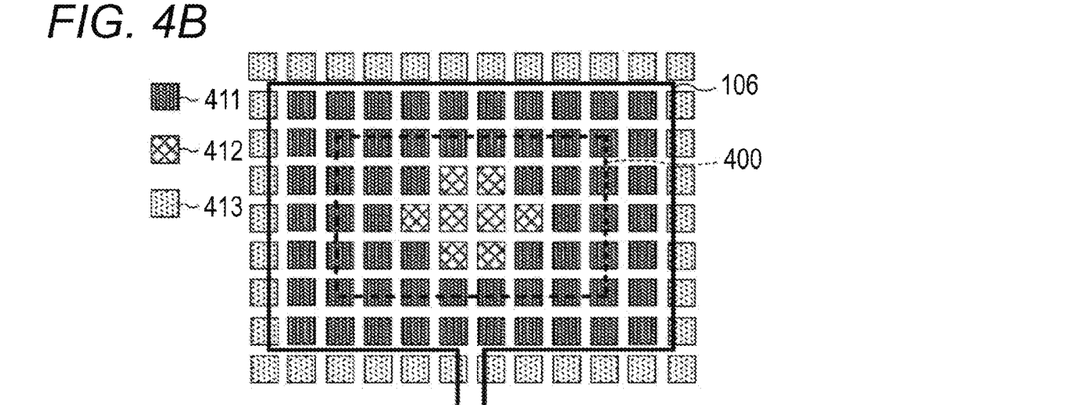
Figure 4C:
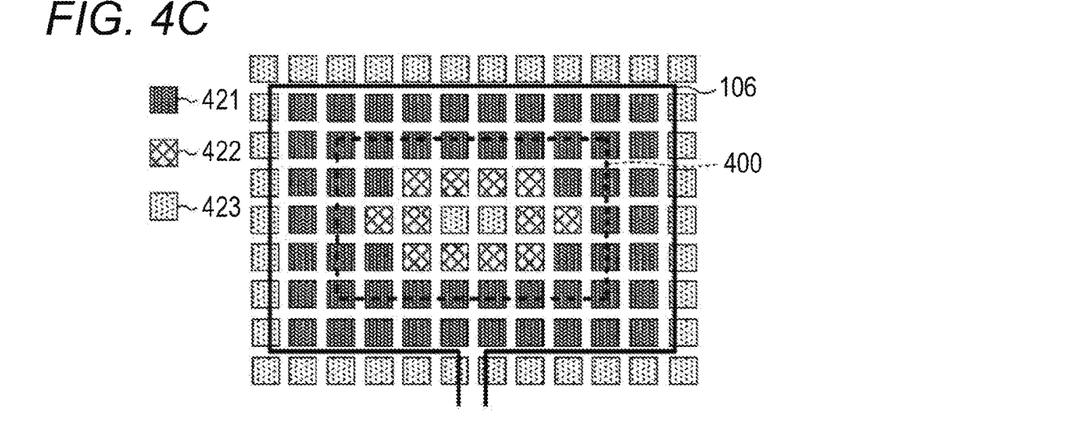

FIGS. 4A to 4C are diagrams each illustrating an example of a magnetic field distribution of the foreign substance detection antenna 106 according to the first exemplary embodiment. Each of the results illustrated in FIGS. 4A to 4C is obtained by analyzing a distribution of magnetic field intensities using an electromagnetic field simulator, in a state in which an arrangement area 400 of the power transmission antenna 104 exists in the loop pattern of the foreign substance detection antenna 106, as in the example illustrated in FIG. 3A. In FIGS. 4A to 4C, the arrangement area 400 of the power transmission antenna 104 indicates a range in which the user is assumed to actually arrange the electronic device 200. A frame indicating the arrangement area 400 can be printed on the exterior of the power transmission apparatus 100.

Blocks 401, 403, 411, 412, 413, 421, 422, and 423 in FIGS. 4A to 4C indicate squire sensing coils for magnetic field detection that have been used in the analysis. In the analysis, the sensing coils, the power transmission antenna 104, and the foreign substance detection antenna 106 are arranged in this order from the above. The results illustrated in FIGS. 4A to 4C indicate results obtained by performing analysis while changing a distance d in the vertical direction between the power transmission antenna 104 and the foreign substance detection antenna 106. The sensing coils are assumed to be separated from the power transmission antenna 104 by a distance equivalent to a distance from a position where the power receiving antenna of the electronic device 200 is placed, which is common in FIGS. 4A to 4C. The number of loops of the foreign substance detection antenna 106 used in the analysis is a single wind.

FIG. 4A indicates an analysis result obtained when the distance d in the vertical direction between the power transmission antenna 104 and the foreign substance detection antenna 106 is set to 6 mm. At this time, magnetic field intensities of the foreign substance detection antenna 106 that are measured by the sensing coils are approximately 5.0 A/m in the region of the block 401, and approximately 3.0 A/m in the region of the block 403.

FIG. 4B indicates an analysis result obtained when the distance d in the vertical direction between the power transmission antenna 104 and the foreign substance detection antenna 106 is set to 4 mm. At this time, magnetic field intensities of the foreign substance detection antenna 106 that are measured by the sensing coils are approximately 7.0 A/m in the region of the block 411, approximately 5.5 A/m in the region of the block 412, and approximately 4.0 A/m in the region of the block 412. When the average magnetic field intensity in the arrangement area 400 of the power transmission antenna 104 is assumed to be 6.25 A/m, the values of the magnetic field intensities fall within about ±12% from the average magnetic field intensity. The magnetic field intensity between the sensing coils used in the analysis is to be considered. It is therefore preferable that the values of magnetic field intensities fall within about 15% from the average magnetic field intensity.

FIG. 4C indicates an analysis result obtained when the distance d in the vertical direction between the power transmission antenna 104 and the foreign substance detection antenna 106 is set to 2 mm. At this time, magnetic field intensities of the foreign substance detection antenna 106 that are measured by the sensing coils are approximately 9.0 A/m in the region of the block 421, approximately 6.5 A/m in the region of the block 422, and approximately 5.0 A/m in the region of the block 423.

Based on the above analysis results, as the distance in the vertical direction between the foreign substance detection antenna 106 and the sensing coils becomes smaller, a distribution of magnetic field intensities in the arrangement area 400 of the power transmission antenna 104 includes a variation. If the distance in the vertical direction between the foreign substance detection antenna 106 and the sensing coils is small, the obtained result indicates that, in the inner portion of the foreign substance detection antenna 106, the magnetic field intensities at the central part are weak while the magnetic field intensities near the foreign substance detection antenna 106 are strong. If the distance in the vertical direction between the foreign substance detection antenna 106 and the sensing coils is set to be large, the values of the magnetic field intensities at the central part of the foreign substance detection antenna 106 and the magnetic field intensities at the peripheral portion become close to each other. Thus, the magnetic field intensities become substantially uniform.

As in the example illustrated in FIG. 4C, if the magnetic field intensities vary in the arrangement area 400 of the power transmission antenna 104, the states of impedance vary depending on the position on the power transmission apparatus 100 where the electronic device 200 is placed. As a result, the VSWR obtained by the control unit 102 greatly varies, so that the obtained VSWR possibly exceeds a normal range of the VSWR recorded in the first memory 109a. In this case, the control unit 102 determines that a foreign substance exists, although a foreign substance other than the electronic device 200 does not actually exist on the power transmission apparatus 100. The determination processing of foreign substance detection is described below.

As in the example illustrated in FIG. 4A, if the magnetic field intensities are substantially uniform in the arrangement area 400 of the power transmission antenna 104, the states of impedance are difficult to vary depending on the position on the power transmission apparatus 100 where the electronic device 200 is placed. Thus, even if the arrangement of the electronic device 200 changes, the change in the VSWR obtained by the control unit 102 becomes small, so that the obtained VSWR falls within the normal range of the VSWR recorded in the first memory 109a. As a result, the erroneous detection of a foreign substance caused by the change in the position where the electronic device 200 is arranged can be suppressed.

Magnetic sheets can be attached to the power transmission antenna 104 and the foreign substance detection antenna 106 on the opposite surfaces of the surfaces on which the electronic device 200 is placed. If analysis is performed in a state in which the magnetic sheets are attached to these antennas, the obtained result indicates that magnetic field intensities become totally stronger. Thus, the distance in the vertical direction between the power transmission antenna 104 and the foreign substance detection antenna 106 can be changed according to the positions or the sizes of the magnetic sheets attached to the power transmission antenna 104 and the foreign substance detection antenna 106. Through the processing, adjustment is performed so that magnetic field intensities become substantially uniform in the arrangement area 400 of the power transmission antenna 104.

(Description of Foreign Substance Detection Determination Processing)

Figure 5:
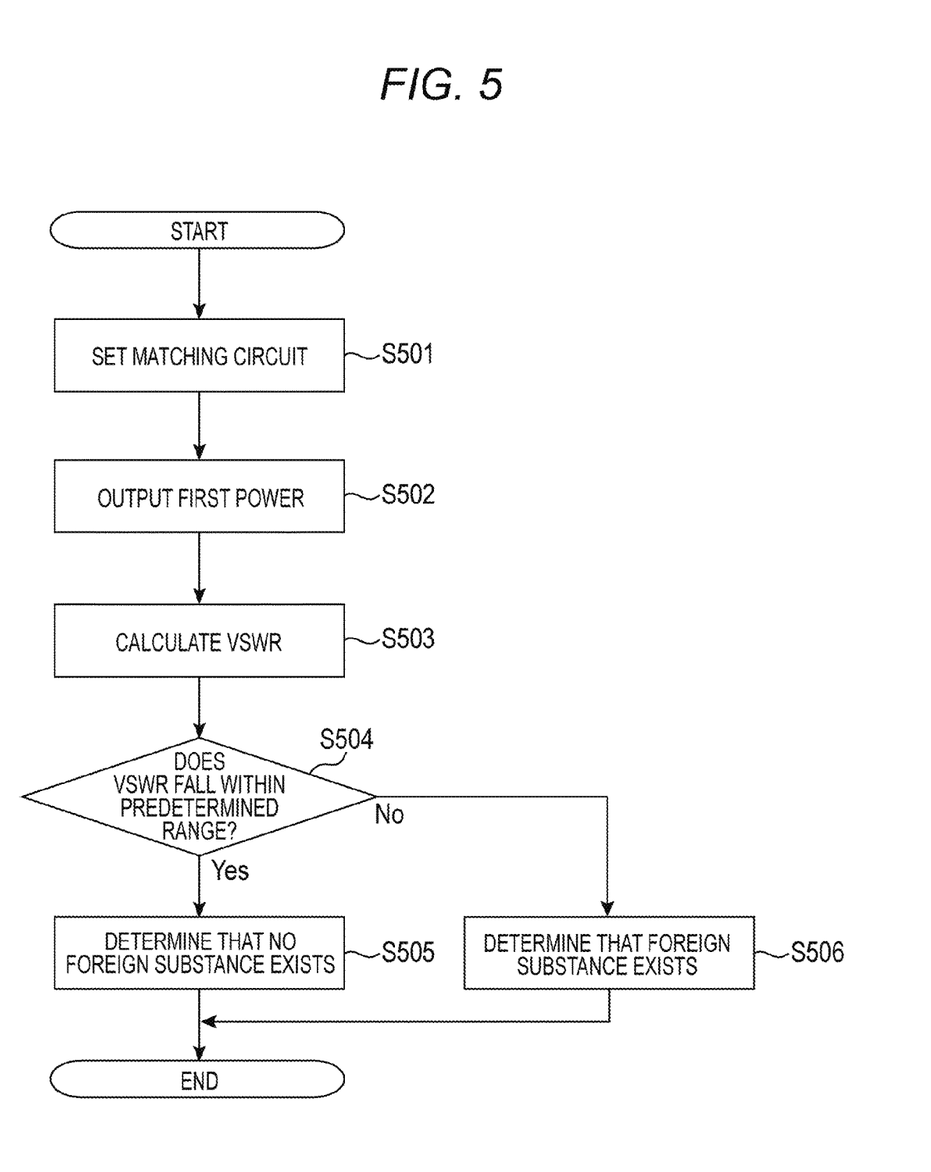
FIG. 5 is a flowchart illustrating an example of foreign substance detection determination processing executed by the power transmission apparatus 100 before power transmission, according to the first exemplary embodiment.

FIG. 5 is a flowchart illustrating an example of foreign substance detection determination processing executed by the power transmission apparatus 100 before power transmission according to the first exemplary embodiment. Each processing illustrated in FIG. 5 is implemented by the control unit 102 executing a computer program stored in the first memory 109a.

First, in S501, the control unit 102 adjusts the matching circuit 105a using setting information of the matching circuit 105a in the foreign substance detection unit 105 recorded in the first memory 109a. The setting information of the matching circuit used here refers to setting information for adjusting the matching circuit 105a in the foreign substance detection unit 105 as part of the power transmission apparatus 100 detecting whether a foreign substance exists. The control unit 102 sets a matching adjustment element, such as a capacitor, that is included in the matching circuit 105a, based on the setting information read-out from the first memory 109a.

Next, in S502, the control unit 102 controls the power generation unit 101 so as to supply first power. The power generation unit 101 supplies the first power to the foreign substance detection antenna 106 via the foreign substance detection unit 105.

Subsequently, in S503, the VSWR detection unit 105b in the foreign substance detection unit 105 detects a VSWR for detecting an impedance matching state of the power transmission apparatus 100 and the electronic device 200. Then, the control unit 102 obtains the VSWR from the VSWR detection unit 105b, and records the obtained VSWR in the first memory 109a.

Next, in S504, the control unit 102 refers to range information of the VSWR recorded in the first memory 109a, and determines whether the VSWR obtained in S503 falls within a predetermined range. For example, the control unit 102 determines whether the VSWR obtained in S503 falls within a range from 1.5 (inclusive) to 2.0 (exclusive). If the VSWR obtained in S503 falls within the predetermined range (YES in S504), the process proceeds to the processing in S505. If the VSWR obtained in S503 falls outside the predetermined range (NO in S504), the process proceeds to the processing in S506.

In S505, the control unit 102 sets a flag, in the first memory 109a, indicating that a foreign substance other than the electronic device 200 does not exist in the vicinity of the power transmission apparatus 100, and the flowchart ends.

In S506, the control unit 102 sets a flag, in the first memory 109a, indicating that a foreign substance other than the electronic device 200 exists in the vicinity of the power transmission apparatus 100, and the flowchart ends. At this time, the control unit 102 can display, on the display unit 111, a message prompting a user to remove the foreign substance from the vicinity of the power transmission apparatus 100.

Through the above-described processing, by comparing the VSWR obtained when a foreign substance is detected with a range of the VSWR obtained when only the electronic device 200 exists in the predetermined range 300, it can be determined whether an object that affects a magnetic field exists in the vicinity of the power transmission apparatus 100.

(Description of Foreign Substance Detection Determination Processing during Power Transmission)

Figure 6:
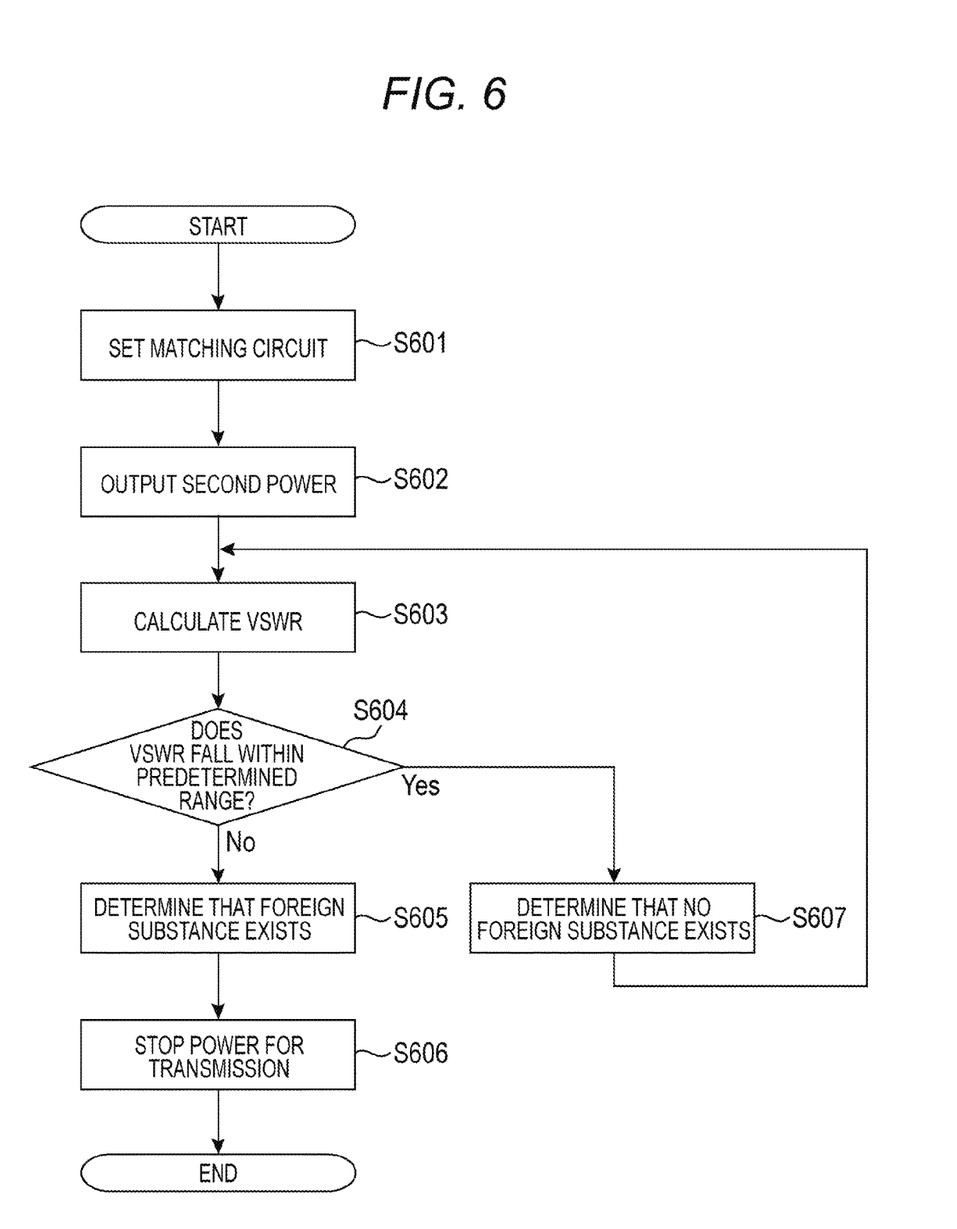
FIG. 6 is a flowchart illustrating an example of foreign substance detection determination processing executed by the power transmission apparatus 100 during power transmission, according to the first exemplary embodiment.

FIG. 6 is a flowchart illustrating an example of foreign substance detection determination processing executed by the power transmission apparatus 100 during power transmission, according to the first exemplary embodiment. Each processing illustrated in FIG. 6 is implemented by the control unit 102 executing a computer program stored in the first memory 109a. In the procedure illustrated in FIG. 5, the determination processing of foreign substance detection is performed using the foreign substance detection unit 105 and the foreign substance detection antenna 106. The determination processing of foreign substance detection can similarly be performed using the power transmission unit 103 and the power transmission antenna 104. The present flowchart, provides a processing performed in a case in which foreign substance detection is performed using the VSWR obtained via the power transmission antenna 104 during the power transmission.

First, in S601, the control unit 102 adjusts the matching circuit using setting information of the matching circuit 103a in the power transmission unit 103 recorded in the first memory 109a. The setting information of the matching circuit used here refers to setting information for the control unit 102 adjusting the matching circuit 103a in the power transmission unit 103 as part of the power transmission apparatus 100 transmitting power to the electronic device 200. The control unit 102 sets a matching adjustment element, such as a capacitor, that is included in the matching circuit, based on the setting information read-out from the first memory 109a.

Next, in S602, the control unit 102 controls the power generation unit 101 so as to supply second power. The power generation unit 101 supplies the second power to the power transmission antenna 104 via the power transmission unit 103.

Subsequently, in S603, the VSWR detection unit 103b in the power transmission unit 103 detects a VSWR for detecting an impedance matching state of the power transmission apparatus 100 and the electronic device 200. Then, the control unit 102 obtains the VSWR from the VSWR detection unit 103b, and records the obtained VSWR in the first memory 109a.

Next, in S604, the control unit 102 refers to range information of the VSWR recorded in the first memory 109a, and determines whether the VSWR obtained in S603 falls within a predetermined range. For example, the control unit 102 determines whether the VSWR obtained in S603 is greater than or equal to 1.0 and less than 1.5. If the VSWR obtained in S603 falls outside the predetermined range (NO in S604), the processing of this flowchart proceeds to processing in S605. If the VSWR obtained in S603 falls within the predetermined range (YES in S604), the processing proceeds to the processing in S607.

In S605, the control unit 102 sets, in the first memory 109a, a flag indicating that a foreign substance other than the electronic device 200 exists in the vicinity of the power transmission apparatus 100.

Then, in S606, under the control of the control unit 102, the power generation unit 101 stops power transmission to the electronic device 200, and the flowchart ends. At this time, the control unit 102 can display, on the display unit 111, a message notifying the user that power transmission processing has stopped. To restart the power transmission processing to the electronic device 200, the control unit 102 can display, on the display unit 111, a message prompting the user to remove the foreign substance from inside the predetermined range 300 in the power transmission apparatus 100.

In S607, the control unit 102 sets a flag, in the first memory 109a, indicating that a foreign substance other than the electronic device 200 does not exist in the vicinity of the power transmission apparatus 100, and the processing returns to S603.

Through the above-described processing, by comparing the VSWR obtained during the power transmission processing with a range of the VSWR obtained when the power transmission processing to the electronic device 200 is executed, it can be determined whether an object that affects a magnetic field exists in the vicinity of the power transmission apparatus 100. In the first exemplary embodiment, a description has been provided of an example in which a change in impedance is obtained based on the VSWR when a foreign substance is detected. A current value or the like can also be used as long as a change in impedance can be detected.

(Second Exemplary Embodiment)

In the first exemplary embodiment, an example was described in which the foreign substance detection antenna 106 and the communication antenna 108 are formed by separate antennas. In the present exemplary embodiment, the foreign substance detection antenna 106 and the communication antenna 108 can be a single common antenna. In this case, a switch is provided to selectively connect either the foreign substance detection unit 105 or the first communication unit 107 with the common antenna. When communication processing is performed with the electronic device 200 using the first communication unit 107, the control unit 102 controls the switch so as to connect the common antenna to the first communication unit 107. In other cases, the control unit 102 controls the switch so as to connect the common antenna to the foreign substance detection unit 105.

It is assumed that the power transmission antenna 104 is arranged on the inner side of the loop pattern of the common antenna, and similarly to the example illustrated in FIG. 3B, the common antenna is arranged below at a predetermined distance d from the power transmission antenna 104. Since the other aspects of the present exemplary embodiment are similar to those in the first exemplary embodiment, their descriptions are omitted herein.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232310, filed Nov. 27, 2015, which is hereby incorporated by reference herein in its entirety.

What is claimed is:

1. A power transmission apparatus comprising:
   a power transmission circuit configured to wirelessly transmit power to an electronic device;
   a foreign substance detection circuit configured to detect a foreign substance affecting power transmission performed by the power transmission circuit;
   a loop shaped power transmission antenna serving as an antenna for the power transmission circuit transmitting power to the electronic device; and
   a foreign substance detection antenna for the foreign substance detection circuit detecting the foreign substance,
   wherein the foreign substance detection antenna is arranged at a predetermined distance or more from the power transmission antenna in a vertical direction to a loop direction of the power transmission antenna, and
   wherein the predetermined distance is a distance at which a magnetic field intensity in a range in which the power transmission antenna is arranged falls within 15% from an average magnetic field intensity of the range.

2. The power transmission apparatus according to claim 1, wherein the foreign substance detection antenna is formed so as to surround the power transmission antenna when viewed in the vertical direction of the loop direction.

3. The power transmission apparatus according to claim 2, wherein a loop of the foreign substance detection antenna is formed on an outer side of a range in which the power transmission antenna is arranged.

4. The power transmission apparatus according to claim 2, wherein the number of winds of the foreign substance detection antenna is 1.

5. The power transmission apparatus according to claim 1, wherein the power transmission antenna and the foreign substance detection antenna are arranged so that central axes match each other.

6. The power transmission apparatus according to claim 1, wherein the foreign substance detection antenna further serves as an antenna for performing communication with the electronic device.

7. The power transmission apparatus according to claim 1, wherein magnetic sheets are attached to the power transmission antenna and the foreign substance detection antenna.

8. The power transmission apparatus according to claim 1, wherein the foreign substance is any of a metal object, an IC card, or an electronic device equipped with an IC tag.

9. A control method for a power transmission apparatus having a power transmission unit, a foreign substance detection unit, a loop shaped power transmission antenna serving as an antenna for the power transmission unit, and a foreign substance detection antenna for the foreign substance detection unit, the method comprising:
   wirelessly transmitting power to an electronic device by the power transmission unit;
   detecting, by the foreign substance detection unit, a foreign substance affecting power transmission performed by the power transmission unit;
   transmitting power to the electronic device via the loop shaped power transmission antenna; and
   detecting the foreign substance using the foreign substance detection antenna,
   wherein the foreign substance detection antenna is arranged at a predetermined distance or more from the power transmission antenna in a vertical direction to a loop direction of the power transmission antenna, and
   wherein the predetermined distance is a distance at which a magnetic field intensity in a range in which the power transmission antenna is arranged falls within 15% from an average magnetic field intensity of the range.

10. A non-transitory computer-readable storage medium storing a program that when executed causes a power transmission apparatus having a power transmission unit, a foreign substance detection unit, a loop shaped power transmission antenna serving as an antenna for the power transmission unit, and a foreign substance detection antenna for the foreign substance detection unit, to perform a control method, the control method comprising:

wirelessly transmitting power to an electronic device by the power transmission unit;

detecting, by the foreign substance detection unit, a foreign substance affecting power transmission performed by the power transmission unit;

transmitting power to the electronic device via the loop shaped power transmission antenna; and detecting the foreign substance using the foreign substance detection antenna, wherein the foreign substance detection antenna is arranged at a predetermined distance or more from the power transmission antenna in a vertical direction to a loop direction of the power transmission antenna, and wherein the predetermined distance is a distance at which a magnetic field intensity in a range in which the power transmission antenna is arranged falls within 15% from an average magnetic field intensity of the range.

* * * * *